(12) United States Patent
Lee et al.

(10) Patent No.: US 7,800,090 B2
(45) Date of Patent: Sep. 21, 2010

(54) OPTICAL POSITION TRACKING INPUT DEVICE HAVING A SELF-TEST FUNCTION AND METHOD OF TESTING THE SAME

(75) Inventors: Woo-Seok Lee, Yongin-si (KR); Bang-Won Lee, Yongin-si (KR)

(73) Assignee: Atlab Inc. (KR)

( * ) Notice: Subject to any disclaimer, the term of this patent is extended or adjusted under 35 U.S.C. 154(b) by 255 days.

(21) Appl. No.: 11/850,766

(22) Filed: Sep. 6, 2007

(65) Prior Publication Data
US 2008/0123498 A1    May 29, 2008

(30) Foreign Application Priority Data
Nov. 28, 2006    (KR) ...................... 10-2006-0118399

(51) Int. Cl.
*G11B 5/55* (2006.01)
(52) U.S. Cl. ............................... 250/559.29; 369/53.38
(58) Field of Classification Search ............ 250/559.29; 369/53.38
See application file for complete search history.

(56) References Cited

U.S. PATENT DOCUMENTS 6,611,480 B2 *   8/2003   Ishibashi et al. ......... 369/47.26

FOREIGN PATENT DOCUMENTS

KR    1020070058715 A    6/2007
KR    1020070081396 A    8/2007

* cited by examiner

*Primary Examiner*—Seung C Sohn
(74) *Attorney, Agent, or Firm*—Cantor Colburn LLP

(57) ABSTRACT

An optical position tracking device and a method of testing the same are provided. The device includes: a controller for generating at least one test operation signal in response to a command signal; a test signal generator for generating a test signal during a test operation in response to the test operation signal; a motion calculator for receiving the test signal during the test operation and performing operations in response to the test operation signal to output an output signal; and an output signal analyzer for determining whether the output signal is correct during the test operation in response to the test operation signal to output a result signal. Thus, the complexity of the method of testing the optical position tracking device can be markedly reduced and it is unnecessary to employ a high-performance test apparatus. Further, the time taken to test the optical position tracking device can be shortened by simplifying and optimizing test circumstances, and a test can be performed by connecting the optical position tracking device with a typical system, such as a personal computer (PC), instead of exclusively employing a test apparatus.

31 Claims, 9 Drawing Sheets

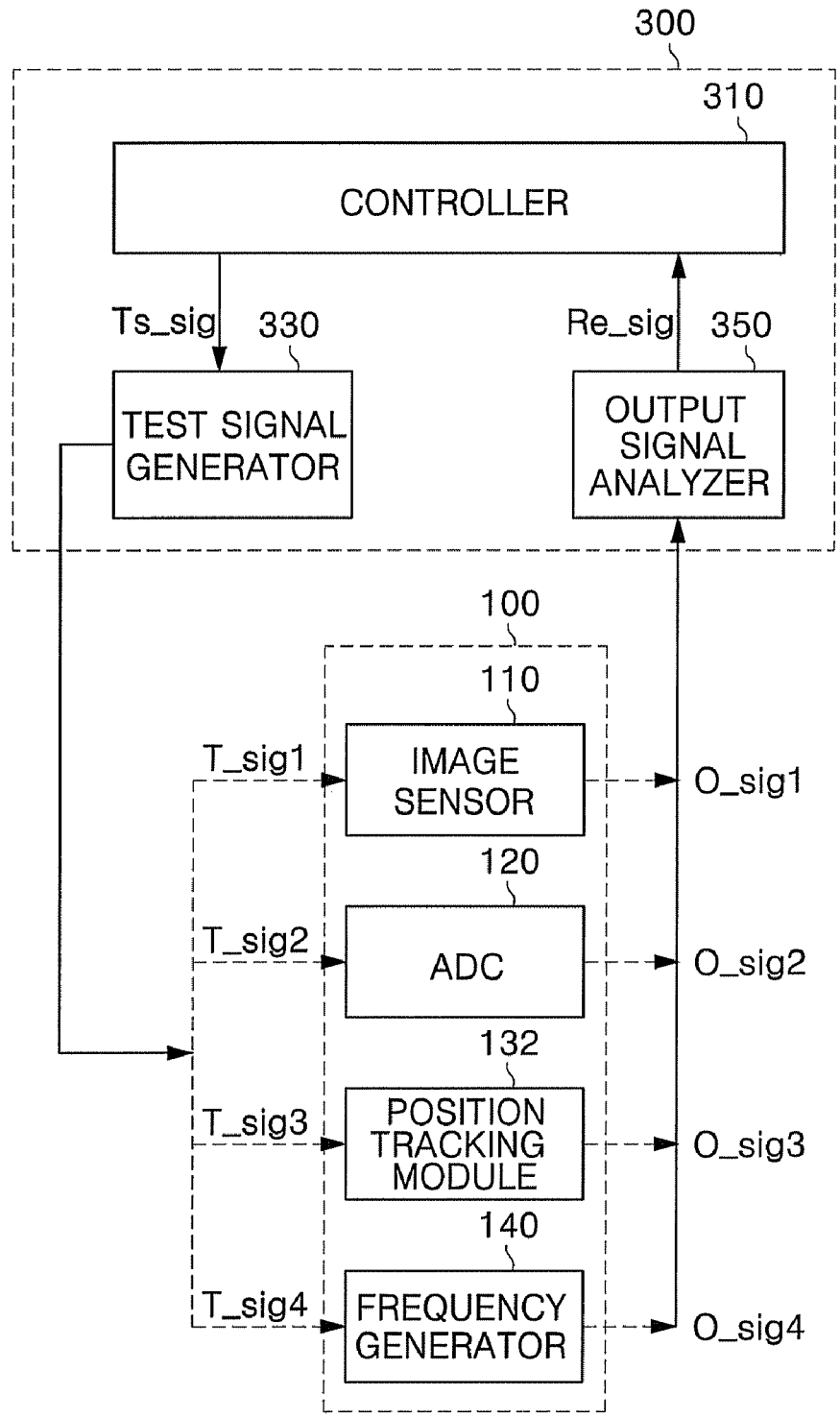

OPTICAL POSITION TRACKING INPUT DEVICE HAVING A SELF-TEST FUNCTION AND METHOD OF TESTING THE SAME

This application claims the benefit of Korean Patent Application No. 2006-118399, filed Nov. 28, 2006, the contents of which are hereby incorporated herein by reference in their entirety.

BACKGROUND OF THE INVENTION

1. Field of the Invention

The present invention relates to an optical position tracking device and, more particularly, to an optical position tracking device having a self-test function, which does not exclusively employ a test apparatus, and a method of testing the same.

2. Description of Related Art

A position tracking device, which is a kind of computer input device, is used to directly or indirectly indicate the coordinates of a cursor or a pointer on a computer. Position tracking devices may be largely classified into a ball position tracking device and an optical position tracking device. The ball position tracking device rotates a ball and inputs a moving direction and distance of the ball. The optical position tracking device tracks the motion of a surface image created by light emitted from a light source of a position tracking unit and detects a moving direction and distance of the surface image.

The optical position tracking device does not mechanically detect the operation of the ball. Instead, the optical position tracking device lights the surface of a worktable to reflect light emitted from the light source of the position tracking unit to create a surface image, consecutively captures the surface image at high speed to compare sequentially captured surface images, and detects a moving direction and distance of the surface image. Thus, the optical position tracking device optically recognizes the motion of a contact object, converts a recognized value into an electrical signal, and transmits the electrical signal to a computer, so that the position of a cursor can be displayed on a monitor.

FIG. 1 is a block diagram of a conventional optical position tracking device.

Referring to FIG. 1, an optical position tracking device 100 includes an image sensor 110 having a plurality of pixels, an analog-to-digital converter (ADC) 120, a logic unit 130, a frequency generator 140, an illumination unit 150, and a lens 160. The logic unit 130 includes a position tracking module 132, an interface portion 134, and an input portion 136. The lens 160 allows light, which is irradiated by the illumination unit 150 and reflected from the surface of a worktable, to travel toward the image sensor 110 having the pixels. The light irradiated by the illumination unit 150 travels in the arrow direction shown in FIG. 1.

Functions and operations of the respective blocks shown in FIG. 1 will now be described.

The image sensor 110 having the pixels receives light reflected from the surface of the worktable through the lens 160, senses an image of an object, and outputs an analog signal corresponding to the sensed image.

The ADC 120 receives the analog signal from the image sensor 110 and converts the analog signal to a digital signal.

The converted digital signal is applied to the position tracking module 132 of the logic unit 130. The position tracking module 132 is synchronized with a clock signal, which is periodically output from the frequency generator 140, calculates a motion value corresponding to the converted digital signal, and outputs a coordinate signal.

The input portion 136 includes a button or a scroll apparatus and outputs an input signal in response to a user's manipulation.

The interface portion 134 outputs motion information INF to an external device, such as a computer, in response to the input signal and the coordinate signal.

The illumination unit 150 may include a light source, which irradiates light to the surface of the worktable, and a control circuit, which turns on or off the light source. The light source may be a light emitting diode (LED).

In order to confirm whether the optical position tracking device including the above-described components operates normally, a test is conducted on the optical position tracking device. In general, the image sensor 110, the ADC 120, the position tracking module 132, and the frequency generator 140 are tested.

FIG. 2 is a block diagram of a conventional optical position tracking device 100 and a test apparatus 300, which are provided separately.

The testing apparatus 300 includes a controller 310, which is used to control a test operation, a test signal generator 330, which outputs a test signal, and an output signal analyzer 350, which analyzes a signal output from an apparatus 100 and determines whether or not the apparatus is normal.

FIG. 2 illustrates the optical position tracking device 100 including only an image sensor 110, an ADC 120, a position tracking module 132, and a frequency generator 140 for brevity, although the optical position tracking device 100 further includes other components.

The controller 310 outputs a test start signal Ts_sig to perform a test on at least one of the image sensor 110, the ADC 120, the position tracking module 132, and the frequency generator 140 included in the optical position tracking device 100.

The test signal generator 330 receives the test start signal Ts_sig and outputs test signals T_sig1 to T_sig4 required for testing the respective apparatuses 110 to 140. The image sensor 110, the ADC 120, the position tracking module 132, and the frequency generator 140 generate output signals O_sig1 to O_sig4 in response to the corresponding test signals T_sig1 to T_sig4, respectively.

The output signals O_sig1 to O_sig4 are applied to the output signal analyzer 350 of the test apparatus 300. The output signal analyzer 350 compares each of the output signals O_sig1 to O_sig4 with an ideal signal, which is expected to be output by the corresponding one of the image sensor 110, the ADC 120, the position tracking module 132, and the frequency generator 140, determines whether or not each of the image sensor 110, the ADC 120, the position tracking module 132, and the frequency generator 140 is normal, and transmits a result signal Re_sig to the controller 310 based on the determination result.

Since the optical position tracking device 100 includes circuits, such as the image sensor 110 having a plurality of pixels, the ADC 120, and the position tracking module 132, and operates in response to various signals, the optical position tracking device 100 requires a high-performance test apparatus for generating the various signals. Also, an input signal required for testing the image sensor 110 is a light-type image signal, which is produced by reflecting light irradiated from an illumination unit by an object. Therefore, during a test operation, a variety of optical signals should be applied to the image sensor 110 using an additional apparatus instead of directly inputting the input signal to the image sensor 110. As a result, it takes much time to test the image sensor 110.

Furthermore, the conventional optical position tracking device 100 may further include an external system, which applies an analog signal to the ADC 120 and confirms an output signal of the ADC 120 in order to test the ADC 120. Also, test pins or test pads for applying an additional test signal are needed to test a plurality of circuits.

SUMMARY OF THE INVENTION

An embodiment of the invention provides an optical position tracking device having a self-test function, which does not require an external high-performance test apparatus.

Another embodiment of the invention provides a method of testing the above-described optical position tracking device.

In one aspect, the present invention is directed to an optical position tracking device including: a controller for generating at least one test operation signal in response to a command signal; a test signal generator for generating a test signal during a test operation in response to the test operation signal; a motion calculator for receiving the test signal during the test operation and performing operations in response to the test operation signal to output an output signal; and an output signal analyzer for determining whether the output signal is correct during the test operation in response to the test operation signal to output a result signal.

The optical position tracking device may further include a test interface unit for transmitting the result signal to an external system.

The controller of the optical position tracking device may additionally output a control signal for controlling the external system, which receives the result signal from the test interface unit, in synchronization with the test operation signal.

The test signal may include: first through fourth test signals, and the test signal generator may include: an image sensor test signal generation module for generating the first test signal for recognizing an image in response to the test operation signal; an ADC test signal generation module for generating an analog signal, which continuously changes over time, as the second test signal in response to the test operation signal; a position tracking module test signal generation module for generating a digital signal having a specific motion as the third test signal in response to the test operation signal; and a frequency generator test signal generation module for generating a signal, which is enabled for a predetermined period of time, as the fourth test signal in response to the test operation signal.

The output signal may include first through fourth output signals. In an embodiment of the present invention, the motion calculator may include: an image sensor for receiving the test signal and recognizing an image to output the first output signal corresponding to the recognized image; an analog-to-digital converter (ADC) for converting the first output signal into a digital signal to output the second output signal; a position tracking module for receiving the second output signal and calculating a motion value to output the third output signal corresponding to the calculated motion value; and a frequency generator for outputting the fourth output signal having a predetermined frequency in response to the test signal. In another embodiment of the present invention, the motion calculator may include: an image sensor for receiving the first test signal during a test operation in response to the test operation signal and recognizing an image to output the first output signal corresponding to the recognized image; an ADC for converting the second test signal into a digital signal during the test operation in response to the test operation signal to output the second output signal; a position tracking module for receiving the third test signal during the test operation in response to the test operation signal and calculating a motion value to output the calculated motion value as the third output signal; and a frequency generator for receiving the fourth test signal during the test operation in response to the test operation signal to output the fourth output signal during an enabled period of the fourth test signal.

The result signal may include: first through fourth result signals, and the output signal analyzer may include an image sensor output signal analysis module for receiving the first output signal in response to the test operation signal, determining whether the first output signal is correct, and outputting the first result signal; an ADC output signal analysis module for receiving the second output signal in response to the test operation signal, determining whether the second output signal is correct, and outputting the second result signal; a position tracking module output signal analysis module for receiving the third output signal in response to the test operation signal, determining whether the third output signal is correct, and outputting the third result signal; and a frequency generator output signal analysis module for receiving the fourth output signal in response to the test operation signal, determining whether the fourth output signal is correct, and outputting the fourth result signal.

The optical position tracking device may further include: an illumination unit for irradiating light to the surface of a worktable; a lens for transmitting light reflected from the surface of the worktable to the image sensor; and an input portion including a button and a scroll apparatus to generate an input signal in response to a user's manipulation.

The illumination unit may control the intensity of light in response to the first test signal, change the image recognized by the image sensor, and display a test result in response to the result signal.

The image sensor may adjust the time taken to recognize the image in response to the first test signal and change the recognized image.

The command signal may be input by the input portion.

In another aspect, the present invention is directed to a method of testing an optical position tracking device. The method includes: generating a command signal for executing a test operation of the optical position tracking device; generating at least one test operation signal for testing a motion calculator in response to the command signal; generating a test signal for testing a test module in response to the test operation signal; receiving the test signal in response to the test operation signal and performing, by the motion calculator, operations to generate an output signal; and inputting the output signal in response to the test operation signal and determining whether the output signal is correct to generate a result signal.

The generation of the test operation signal may include additionally generating a control signal for controlling an external system in synchronization with the test operation signal.

In an embodiment of the present invention, the output signal may include first through fourth output signals, and the generation of the output signal may include: recognizing an image in response to the test signal and outputting the first output signal corresponding to the recognized image; converting the first output signal into a digital signal and outputting the second output signal; outputting the fourth output signal having a predetermined frequency in response to the test signal; and inputting the second output signal, calculating a motion value, and synchronizing the calculated motion value with the fourth output signal to output the third output signal.

The test signal may include: a first test signal for allowing an image sensor to recognize an image; a second test signal continuously changing over time; a third test signal having a specific motion; and a fourth test signal enabled for a predetermined period of time, and output the test signal comprises at least one of the first through fourth test signals in response to the test operation signal.

In another embodiment of the present invention, the output signal may include: a first output signal corresponding to the image recognized by the image sensor; a second output signal obtained by converting the second test signal into a digital signal; a third output signal corresponding to a motion value calculated using the third test signal; and a fourth output signal having a predetermined frequency and output during the enabled period of the fourth test signal. The generation of the output signal may include outputting only one of the first through fourth output signals corresponding to the test signal output during the generation of the test signal.

The result signal may include: a first result signal output by determining whether the first output signal is correct; a second result signal output by determining whether the second output signal is correct; a third result signal output by determining whether the third output signal is correct; and a fourth result signal output by determining whether the fourth output signal is correct, and the generation of the result signal may include outputting only one of the first through fourth result signals corresponding to the output signal output during the generation of the output signal.

The generation of the result signal may include: generating first through fourth reference signals in response to the test operation signal; and comparing the first through fourth output signals with the first through fourth reference signals, respectively, to determine whether the first through fourth output signals are correct.

The generation of the command signal may be performed by handling an input portion of the optical position tracking device.

In still another embodiment of the present invention, the generation of the output signal may include: adjusting the intensity of light output from an illumination unit of the optical position tracking device in response to the test signal; sensing an image according to the adjusted intensity of light; and outputting the output signal corresponding to the sensed image.

In yet another embodiment of the present invention, the generation of the output signal may include: adjusting a sensing time of an image sensor of the optical position tracking device in response to the test signal; sensing an image according to the adjusted sensing time; and outputting the output signal corresponding to the sensed image.

BRIEF DESCRIPTION OF THE DRAWINGS

The foregoing and other objects, features and advantages of the invention will be apparent from the more particular description of exemplary embodiments of the invention, as illustrated in the accompanying drawings. The drawings are not necessarily to scale, emphasis instead being placed upon illustrating the principles of the invention.

FIG. 2 is a block diagram of a conventional optical position tracking device and a conventional test apparatus for testing the optical position tracking device.

DETAILED DESCRIPTION OF THE INVENTION

An optical position tracking device and a method of testing the same according to the present invention will now be described more fully hereinafter with reference to the accompanying drawings, in which exemplary embodiments of the invention are shown.

Figure 3A:
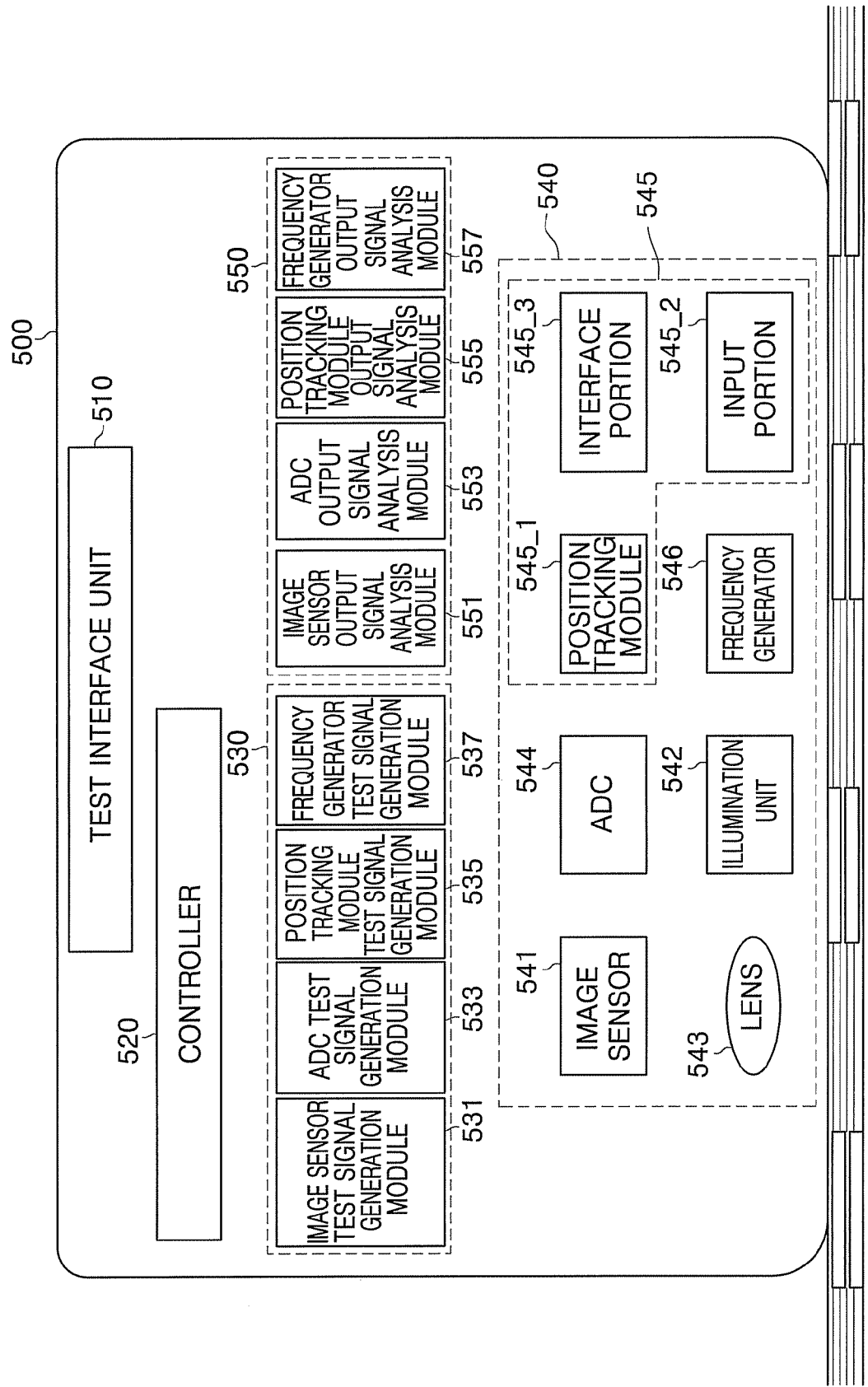
FIG. 3A is a block diagram of an optical position tracking device having a self-test function according to an embodiment of the present invention.

FIG. 3A is a block diagram of an optical position tracking device according to an embodiment of the present invention.

Referring to FIG. 3A, an optical position tracking device 500 includes a test interface unit 510, a controller 520, a test signal generator 530 having at least one test signal generation module, an output signal analyzer 550 having at least one output signal analysis module, and a motion calculator 540. The motion calculator 540 includes an image sensor 541, an illumination unit 542, a lens 543, an ADC 544, and a logic unit 545 including a position tracking module 545_1, an input portion 545_2, and an interface portion 545_3 like the conventional optical position tracking device described in "Background of the Invention".

Unlike the conventional optical position tracking device, the optical position tracking device 500 according to the present invention includes apparatuses having test functions, specifically, the test interface unit 510, the controller 520, the test signal generator 530, and the output signal analyzer 550. Thus, the optical position tracking device 500 can be switched between a normal mode in which the optical position tracking device 500 performs a normal function and a test mode in which the optical position tracking device 500 performs a test function.

The test interface unit 510, that is connected to a computer or an external system, externally receives a command signal for testing the optical position tracking device 500 and outputs a test result to the computer or the external system.

The controller 520 outputs a test operation signal for enabling the test mode in which the optical position tracking device 500 is tested, or a normal operation signal for enabling the normal mode in which the optical position tracking device 500 detects the motion of an object, in response to the command signal. The command signal may be input to the controller 520 through the input portion 545_2 or the image sensor 541.

Also, the controller 520 may generate a control signal for controlling an external system, which is interlocked with the optical position tracking device 500, via the test interface unit 510 in synchronization with the test operation signal. For example, the optical position tracking device 500 may be connected to an external system for applying a power supply voltage to the optical position tracking device 500 or controlling a test temperature through the test interface unit 510. In this case, the controller 520 may generate a control signal "con" to control the external system so that the external system can change the power supply voltage or control the test temperature.

Figure 1:
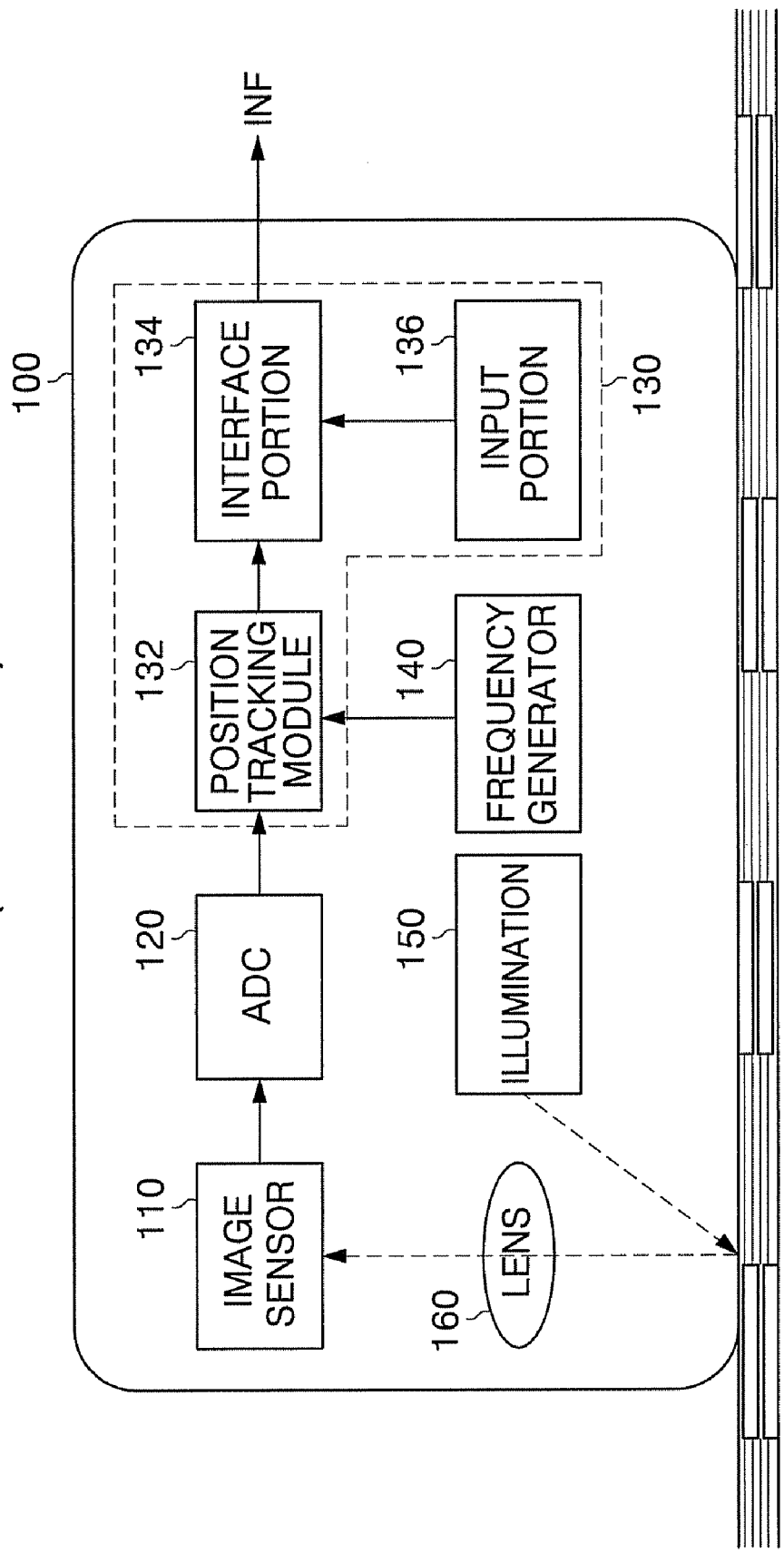
FIG. 1 is a block diagram of a conventional optical position tracking device.

The motion calculator 540 includes the image sensor 541, the illumination unit 542, the lens 543, the ADC 544, a frequency generator 546, and the logic unit 545 including the position tracking module 545_1, an input portion 545_2, and an interface portion 545_3. Since the functions of the above-described components of the motion calculator 540 are the same as that described with reference to FIG. 1, a description thereof is omitted here.

The test signal generator 530 includes an image sensor test signal generation module 531, an ADC test signal generation module 533, a position tracking module test signal generation module 535, and a frequency generator test signal generation module 537.

The test signal generator 530 performs no function in the normal mode. When the optical position tracking device operates in the test mode, the test signal generator 530 receives the test operation signal for enabling the test mode from the controller 520 and performs test-mode operations.

The image sensor test signal generation module 531, the ADC test signal generation module 533, the position tracking module test signal generation module 535, and the frequency generator test signal generator module 537 of the test signal generator 530 receive the test operation signal from the controller 520 and output test signals for testing the image sensor 541, the ADC 544, the position tracking module 545_1, and the frequency generator 546, respectively.

The output signal analyzer 550 includes an image sensor output signal analysis module 551, an ADC output signal analysis module 553, a position tracking module output signal analysis module 555, and a frequency generator output signal analysis module 557.

The output signal analyzer 550 performs no function in the normal mode. When the optical position tracking device operates in the test mode, the output signal analyzer 550 receives the test operation signal for enabling the test mode from the controller 520 and performs test-mode operations.

The image sensor output signal analysis module 551, the ADC 553, the position tracking module output signal analysis module 555, and the frequency generator output signal analysis module 557 of the output signal analyzer 550 receive output signals from the image sensor 541, the ADC 544, the position tracking module 545_1, and the frequency generator 546, compare the output signals with reference signals used for determining whether the respective apparatuses 551, 553, 555, and 557 are normal, and output comparison result signals, respectively.

For brevity, it is assumed that the optical position tracking device 500 according to the present invention is initialized to operate in the normal mode.

In the normal mode, the controller 520 outputs the normal operation signal to the motion calculator 540 so that the optical position tracking device 500 can perform a normal-mode operation due to initialization. Since the operation of the motion calculator 540 is the same as that described with reference to FIG. 1, a description thereof is omitted here and only a test-mode operation of the optical position tracking device 500 will be described.

Figure 3B:
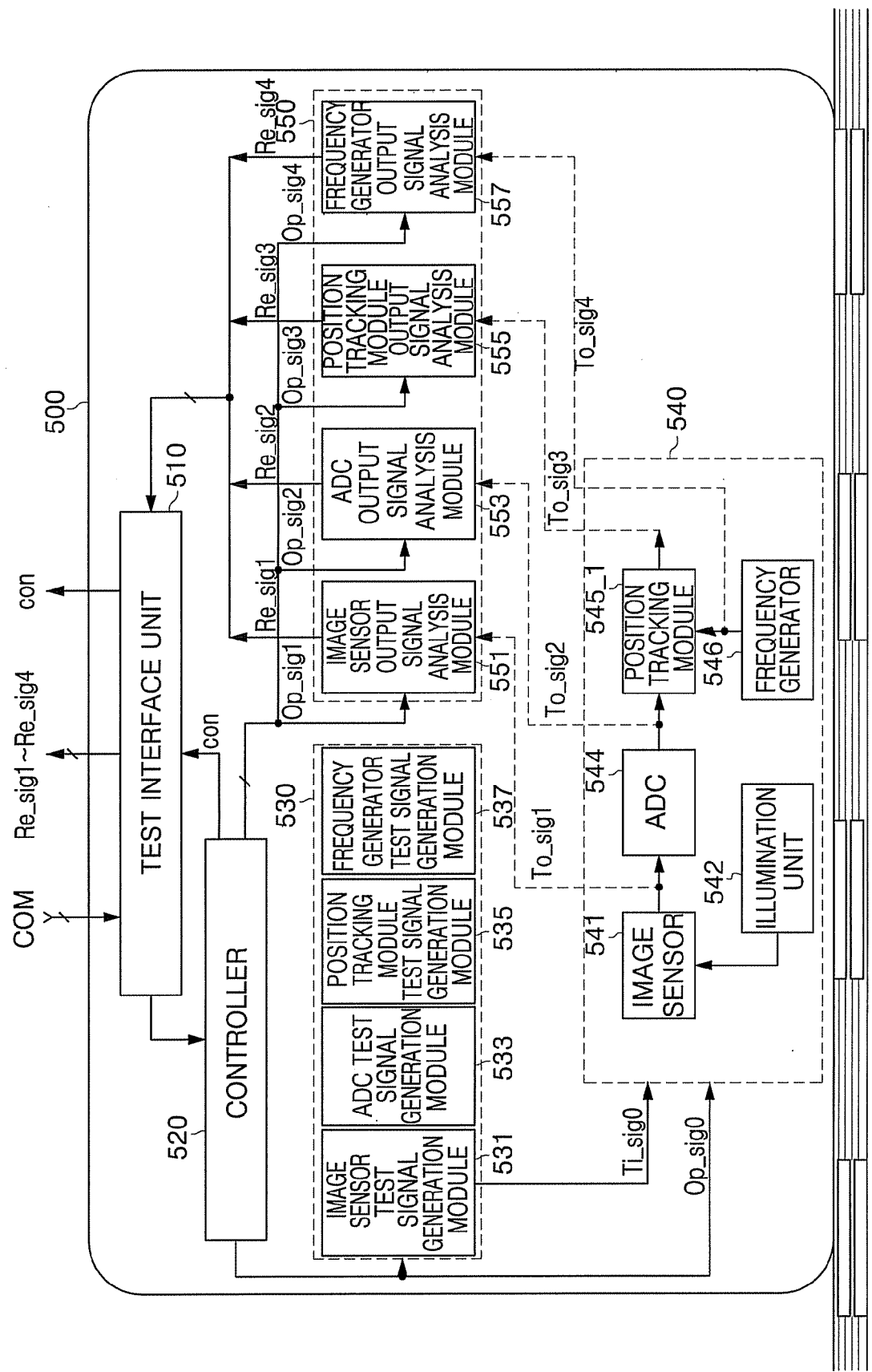
FIG. 3B is a block diagram illustrating a test-mode operation of an optical position tracking device according to an embodiment of the present invention.

FIG. 3B is a block diagram illustrating a test-mode operation of an optical position tracking device according to an embodiment of the present invention. Apparatuses included in an optical position tracking device 500 of FIG. 3B are the same as in FIG. 3A, and FIG. 3B illustrates only part of apparatuses of a motion calculator 540 for brevity.

Operations of the respective blocks will now be described with reference to FIG. 3B.

A controller 520 externally receives a command signal COM via a test interface unit 510, outputs a test operation signal Op_sig0 to the motion calculator 540 and a test signal generator 530, and outputs test operation signals Op_sig1 to Op_sig4 to output signal analysis modules 551 to 557 of an output signal analyzer 550, respectively. Although not shown in the drawings, the command signal COM may be input to the controller 520 through an input portion (not shown) or an image sensor 541 of the motion calculator 540. For example, the command signal COM may be input by handling a mouse button in a specific manner or recognizing a specific image using the image sensor 541. Also, the controller 520 may output a control signal "con" for controlling an external system connected to the test interface unit 510 through the test interface unit 510 as illustrated in FIG. 3A.

The test signal generator 530 outputs a test signal Ti_sig0 in response to the test operation signal Op_sig0. For instance, the controller 520 outputs the test operation signal Op_sig0 to the test signal generator 530 in response to a specific command signal COM. The test signal generator 530 outputs the test signal Ti_sig0 to the image sensor 541 or an illumination unit 542 of the motion calculator 540 using an image sensor test signal generation module 531 in response to the test operation signal Op_sig0.

The motion calculator 540 allows the image sensor 541 to recognize a specific image using the illumination unit 542 in response to the test operation signal Op_sig0 and the test signal Ti_sig0. The image sensor 541 outputs as a first output signal an analog data signal To_sig1 corresponding to the recognized image. In this case, the specific image may be provided in test circumstances, and the image sensor 541 and the illumination unit 542 may be constructed to make a change in the image recognized by the image sensor 541 in response to the test signal Ti_sig0. For example, the image recognized by the image sensor 541 can be changed by adjusting a time taken for the image sensor 541 to recognize the image or the intensity of light irradiated by the illumination unit 542.

An ADC 544 outputs a digital signal To_sig2 as a second output signal in response to the analog data signal To_sig1.

A position tracking module 545_1 outputs a coordinate signal as a third output signal To_sig3 in synchronization with a clock signal of a frequency generator 546 as a fourth output signal To_sig4 in response to the digital signal To_sig2. The frequency generator 546 outputs the clock signal To_sig4 having a predetermined frequency as the fourth output signal in response to the test operation signal Op_sig0 and the test signal Ti_sig0. Although it is exemplarily illustrated in FIG. 3B that the position tracking module 545_1 outputs the third output signal To_sig3 in synchronization of the fourth output signal To_sig4, which is a clock signal output from the frequency generator 546, the position tracking module 545_1 may output the third output signal To_sig3 in synchronization with an externally input clock signal.

The output signals To_sig1 to To_sig4 are applied to an image sensor output signal analysis module 551, an ADC output signal analysis module 553, a position tracking module output signal analysis module 555, and a frequency generator output signal analysis module 557 of the output signal analyzer 550, respectively.

The respective output signal analysis modules 551 to 557 of the output signal analyzer 550 generate reference signals in response to the test operation signals Op_sig1 to Op_sig4 output from the controller 520, compare the output signals To_sig1 to To_sig4 output from the motion calculator 540 with the reference signals, respectively, determine whether the apparatuses 541, 544, 545_1, and 546 are normal, and externally transmit test result signals Re_sig1 to Re_sig4 through the test interface unit 510.

In the current embodiment of the present invention as illustrated in FIG. 3B, the respective apparatuses of the motion calculator 540 receive the test operation signal Op_sig0 and the test signal Ti_sig0 from the controller 520 and the test signal generator 530, respectively, and generate output signals to the next apparatus so that a test operation is enabled. Although FIG. 3B illustrates the test signal generator 530 outputting the test signal Ti_sig0 in response to the test operation signal Op_sig0, the controller 520 may output the test signal Ti_sig0. Also, the motion calculator 540 may perform the foregoing test operation in response to only the test operation signal Op_sig0 output from the controller 520 excepting the test signal Ti_sig0.

Conventionally, an optical position tracking device must be connected to a specialized high-performance test apparatus and receive a test signal from the test apparatus so that a test on the optical position tracking device can be performed. However, the optical position tracking device 500 according to the present invention can be tested with a specialized high-performance test apparatus or a simple system in which a program for driving the controller 520 is installed.

When the optical position tracking device 500 is tested using the method described with reference to FIG. 3B, since the test signal generator 530 outputs a test signal in a simple manner, the construction of the test signal generator 530 can be simplified. Also, the operation of the test signal generator 530 may be omitted according to the construction method of the optical position tracking device 500. In this case, construction and test the optical position tracking device 500 become simple. However, it is difficult to select a test on a specific apparatus within the device 500, and to find a specific failure in the output of one apparatus within the device 500.

Figure 3C:
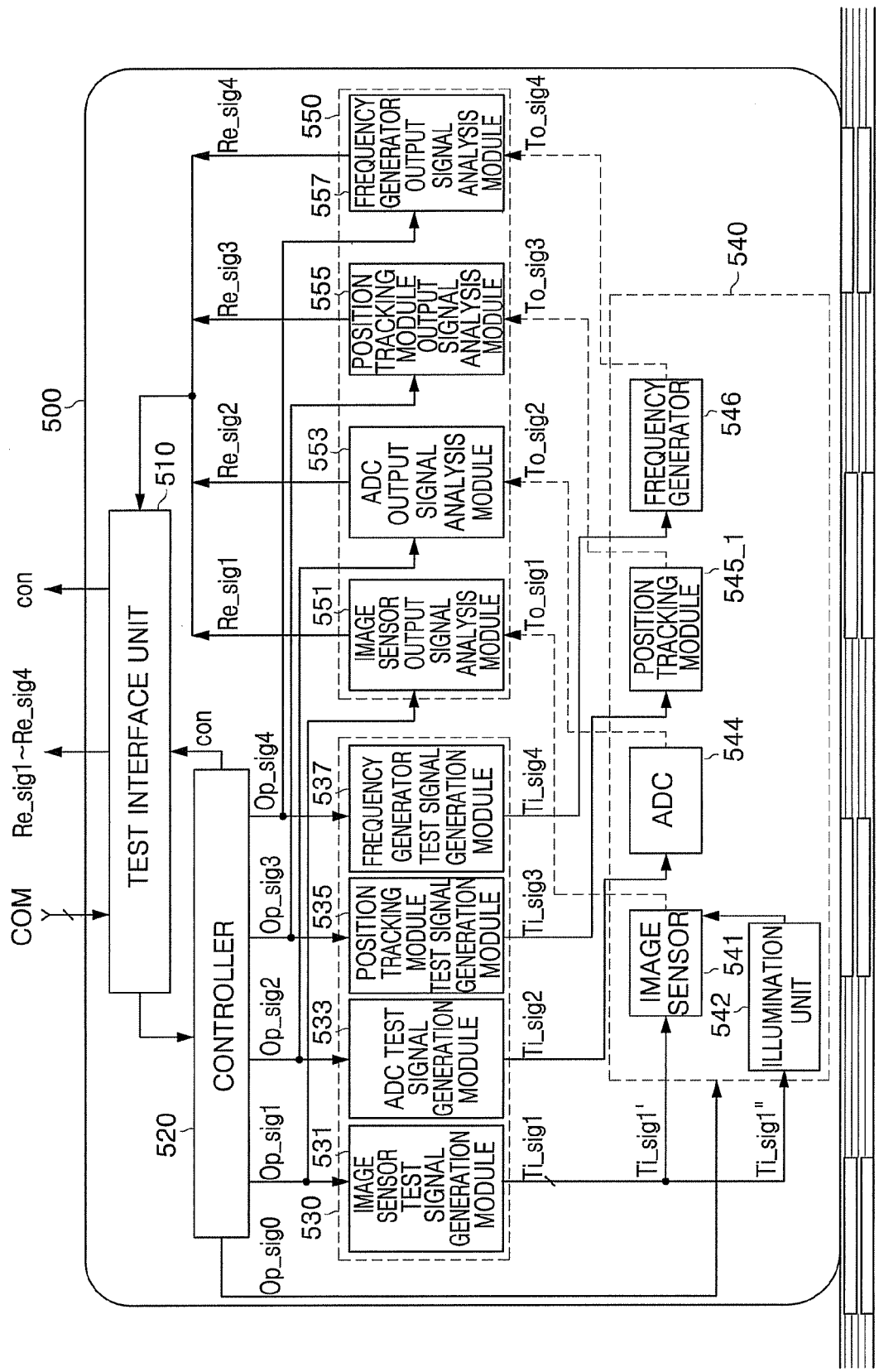
FIG. 3C is a block diagram illustrating a test-mode operation of an optical position tracking device according to another embodiment of the present invention.

FIG. 3C is a block diagram illustrating a test-mode operation of an optical position tracking device according to another embodiment of the present invention. Apparatuses included in an optical position tracking device 500 of FIG. 3C are the same as in FIG. 3A, and FIG. 3C illustrates only part of apparatuses of a motion calculator 540 for simplicity.

Operations of the respective blocks will now be described with reference to FIG. 3C.

A controller 520 externally receives a command signal COM via a test interface unit 510, outputs a test operation signal Op_sig0 to a motion calculator 540, outputs test operation signals Op_sig1 to Op_sig4 to test signal generation modules 531 to 537 of a test signal generator 530, respectively, and outputs the test operation signals Op_sig1 to Op_sig4 to output signal analysis modules 551 to 557 of an output signal analyzer 550, respectively. Although not shown in the drawings, the command signal COM may be input to the controller 520 through an input portion (not shown) or an image sensor 541 of the motion calculator 540. For example, the command signal COM may be input by handling a mouse button in a specific manner or recognizing a specific image or images in sequence using the image sensor 541. Also, the controller 520 may output a control signal "con" for controlling an external system connected to the test interface unit 510 as described above.

Also, the command signal COM may be a signal for testing one apparatus or a plurality of apparatuses according to a user's purposes. For instance, the command signal COM may be a signal for testing only the image sensor 541 or a signal for testing both a position tracking module 545_1 and a frequency generator 546.

The controller 520 outputs only one or ones of the test operation signals Op_sig1 to Op_sig4 corresponding to the apparatus or apparatuses to be tested in response to the command signal COM to the test signal generator 530 and the output signal analyzer 550. For example, when the command signal COM is used to test only an ADC 544, the controller 520 outputs the test operation signal Op_sig2 to test the ADC 544. Also, when the command signal COM is used to test all the apparatuses 541 to 546, the controller 520 outputs the test operation signals Op_sig1 to Op_sig4 to test all the apparatuses 541 to 546.

An image sensor test signal generation module 531, an ADC test signal generation module 533, a position tracking module test signal generation module 535, and a frequency generator test signal generation module 537 of the test signal generator 530 receive the test operation signals Op_sig1 to Op_sig4, respectively, and output test signals Ti_sig1 to Ti_sig4 to test the image sensor 541, the ADC 544, the position tracking module 545_1, and the frequency generator 546, respectively.

The image sensor 541, the ADC 544, the position tracking module 545_1, and the frequency generator 546 of the motion calculator 540 receive the corresponding test signals Ti_sig1 to Ti_sig4, respectively, perform operations, and generate output signals To_sig1 to To_sig4, respectively.

The ADC 544, the position tracking module 545_1, and the frequency generator 546 can obtain desired signals from the test signals Ti_sig2 to Ti_sig4 of the corresponding test signal generation modules 533 to 537, but a specific image should be input to the image sensor 541 to test the image sensor 541. Therefore, the image needs to be created by specific control.

The test signal Ti_sig1 for testing the image sensor 541 includes a signal Ti_sig1' for controlling the image sensor 541 and a signal Ti_sig1" for controlling the illumination unit 542, and allows the image sensor 541 to recognize a specific image required for testing the image sensor 541. The image required for testing the image sensor 541 may be a bottom image provided in test circumstances. Also, the image sensor 541 may be constructed to recognize a different image required for testing the image sensor 541 from an image recognized in a normal mode by adjusting, for example, a time taken for the image sensor 541 to be irradiated with light or the intensity of light irradiated by the illumination unit 542.

An image sensor output signal analysis module 551, an ADC output signal analysis module 553, a position tracking module output signal analysis module 555, and a frequency generator output signal analysis module 557 of the output signal analyzer 550 correspond to the image sensor 541, the ADC 544, the position tracking module 545_1, and the frequency generator 546, respectively, receive the test operation signals Op_sig1 to Op_sig4, respectively, perform operations, and generate reference signals for determining whether the image sensor 541, the ADC 544, the position tracking module 545_1, and the frequency generator 546 are normal.

Also, the output signal analysis modules 551 to 557 of the output signal analyzer 550 receive the output signals To_sig1 to To_sig4 from the corresponding apparatuses 541 to 546, respectively, compare the output signals To_sig1 to To_sig4 with the reference signals, and output test result signals Re_sig1 to Re_sig4 based on the comparison results.

The test result signals Re_sig1 to Re_sig4 are output through the illumination unit 542 used for the optical position tracking device 500 or transmitted to an external additional apparatus (not shown) through the test interface unit 510.

When using a semiconductor test apparatus for an optical position tracking device, it is only necessary to input the test result signals Re_sig1 to Re_sig4 to the semiconductor test apparatus. In this case, a simple apparatus in which a program required for a test is stored may be employed as the test apparatus instead of a specialized high-performance test apparatus for the optical position tracking device.

Although it is described above that the optical position tracking device 500, which is initialized to operate in the normal mode, externally receives the command signal COM and enters the test mode, the reverse case is also possible. That is, the optical position tracking device 500, which is initialized to operate in the test mode, may be switched to the normal mode after a test operation is finished.

Also, a button having an on/off function may be installed outside the optical position tracking device 500 so that the optical position tracking device 500 can be switched between a normal mode and a test mode. Thus, the optical position tracking device 500 can operate in the normal mode when the button is turned on, and operate in the test mode when the button is turned off.

In this case, the optical position tracking device 500 may further include a light emitting diode (LED) for indicating whether or not each of the internal apparatuses is normal. Thus, the LED may take on a green color when each of the apparatuses is normal, and may take on a red color when each of the apparatuses is abnormal, so that a user can notice the state of the optical position tracking device 500.

In comparison with a conventional case where an optical position tracking device is tested by connecting the optical position tracking device with a specialized high-performance test apparatus thereof, the present invention provides a simple method of testing an optical position tracking device by handling a mouse button in a specific combination manner, inputting a command signal using an image sensor, or generating a signal similar to the command signal to a typical system. Also, a semiconductor device for an optical position tracking device may be tested by generating only the test operation signals Op_sig1 to Op_sig4 without a specialized high-performance test apparatus.

The methods of testing the optical position tracking device 500 according to the embodiments of the present invention are separately described above with reference to FIGS. 3B and 3C. However, after simply testing the optical position tracking device 500 using the method described with reference to FIG. 3B, the optical position tracking device 500 may enter the normal mode when it is determined that the optical position tracking device 500 is normal, and may enter a further test mode using the method described with reference to FIG. 3C when it is determined that the optical position tracking device 500 is abnormal.

Hereinafter, methods of testing respective apparatuses of an optical position tracking device according to an embodiment of the present invention will be described with reference to FIGS. 4 through 7.

Figure 4:
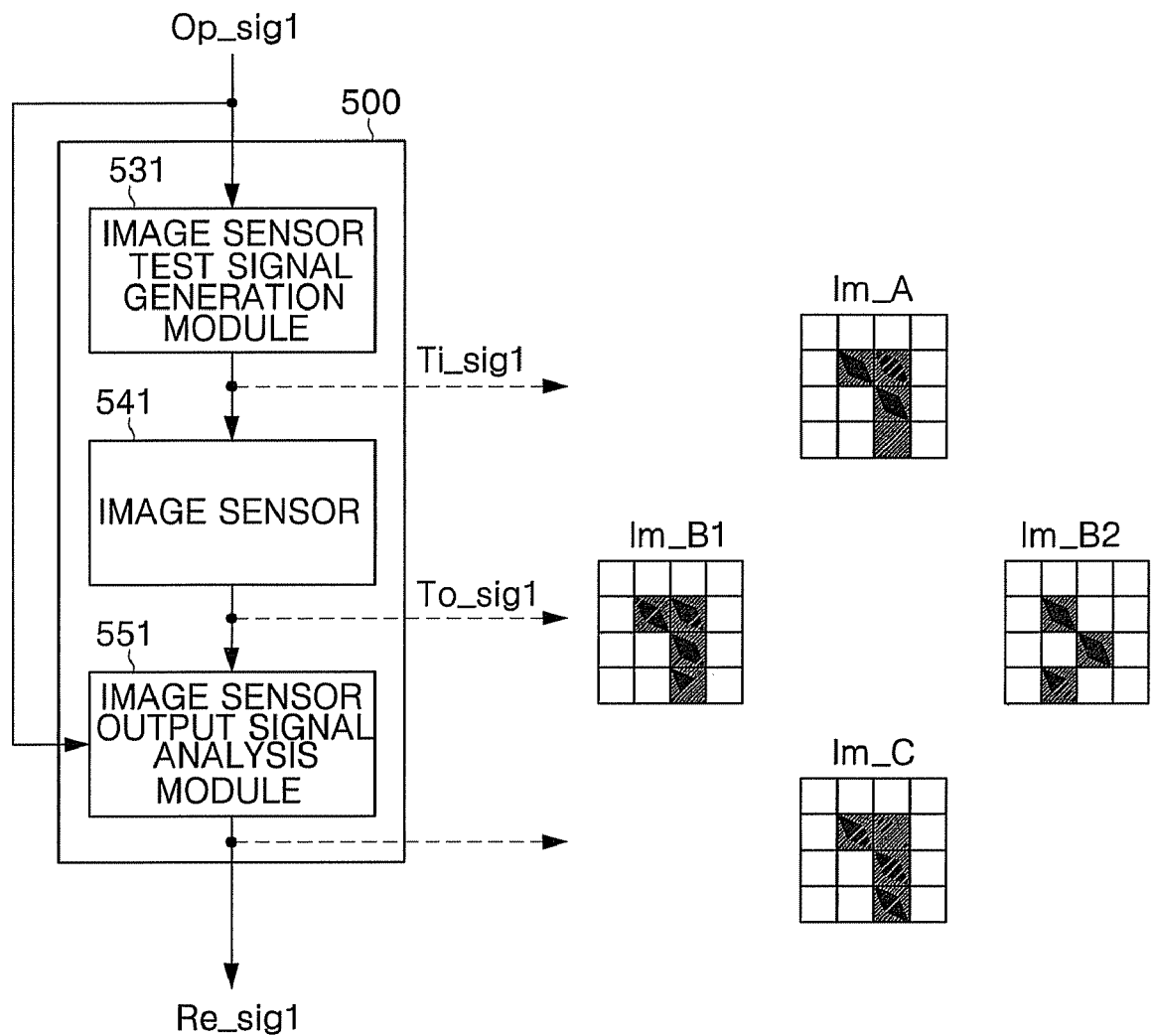
FIG. 4 is a diagram illustrating a method of testing an image sensor included in an optical position tracking device according to an embodiment of the present invention.

FIG. 4 is a diagram illustrating a method of testing an image sensor included in an optical position tracking device according to an embodiment of the present invention.

FIG. 4 illustrates an image sensor test signal generator module 531, an image sensor 541, and an image sensor output signal analysis module 551 of an optical position tracking device 500 and images Im_A to Im_C corresponding to output signals generated during respective processes. In FIG. 4, Im_A denotes an image created in response to a test signal Ti_sig1 in test circumstances, Im_B1 and Im_B2 denote images that are actually recognized by the image sensor 541, and Im_C is an image that is expected to be recognized by the image sensor 541 during a test operation.

A method of testing the image sensor 531 will now be described with reference to FIGS. 3C and 4.

When a command signal COM for testing the image sensor 541 is externally applied from a computer or an external system through a test interface unit 510 to a controller 520, the controller 520 outputs an operation signal Op_sig1 for testing the image sensor 541 to the image sensor test signal generation module 531 and the image sensor output signal analysis module 551. Here, the command signal COM may be generated by handling a specific mouse button or using the image sensor 541 or an external system. It is clear that a test apparatus should generate the command signal COM to test a semiconductor device for the optical position tracking device 500.

As described above, the test signal Ti_sig1 output from the image sensor test signal generation module 531 is a signal for controlling the image sensor 531 and an illumination unit 542 to create a specific image required for a test on the image sensor 541. That is, when testing the image sensor 541, a specific image is provided in test circumstances, and the image sensor 541 and/or the illumination unit 542 operate in response to the test signal Ti_sig1 so that the image sensor 541 can recognize the specific image. In this case, the image sensor test signal generation module 531 outputs an appropriate test signal Ti_sig1 and permits the image sensor 541 to recognize the specific image, unlike when the image sensor 541 performs a normal-mode operation.

The image sensor 541 performs operations in response to the test signal Ti_sig1 output from the image sensor test signal generation module 531 and transmits an output signal To_sig1 corresponding to the recognized image. The image sensor output signal analysis module 551 may compare the output signal To_sig1 with an ideal test output model signal, confirm whether the output signal To_sig1 is equal to the ideal test output model signal, determine whether the image sensor 541 is normal based on the comparison result, and transmit a result signal Re_sig1 via the test interface unit 510 to an external system (not shown) or display the result signal Re_sig1 using the illumination unit 542.

For example, when the image Im_A is created by the test signal Ti_sig1 in test circumstances and the output signal To_sig1 output from the image sensor 541 in response to the test signal Ti_sig1 has information on the image Im_B1, since the output signal To_sig1 is equal to a test reference signal having information on the image Im_C, the test result signal Re_sig1 output from the image sensor output signal analysis module 551 denotes that the image sensor 541 is normal.

On the other hand, when the output signal To_sig1 output from the image sensor 541 in response to the test signal Ti_sig1 has information on the image Im_B2, since the output signal To_sig1 is different from the test reference signal having information on the image Im_C, the test result signal Re_sig1 output from the image sensor output signal analysis module 551 denotes that the image sensor 541 is abnormal.

Figure 5:
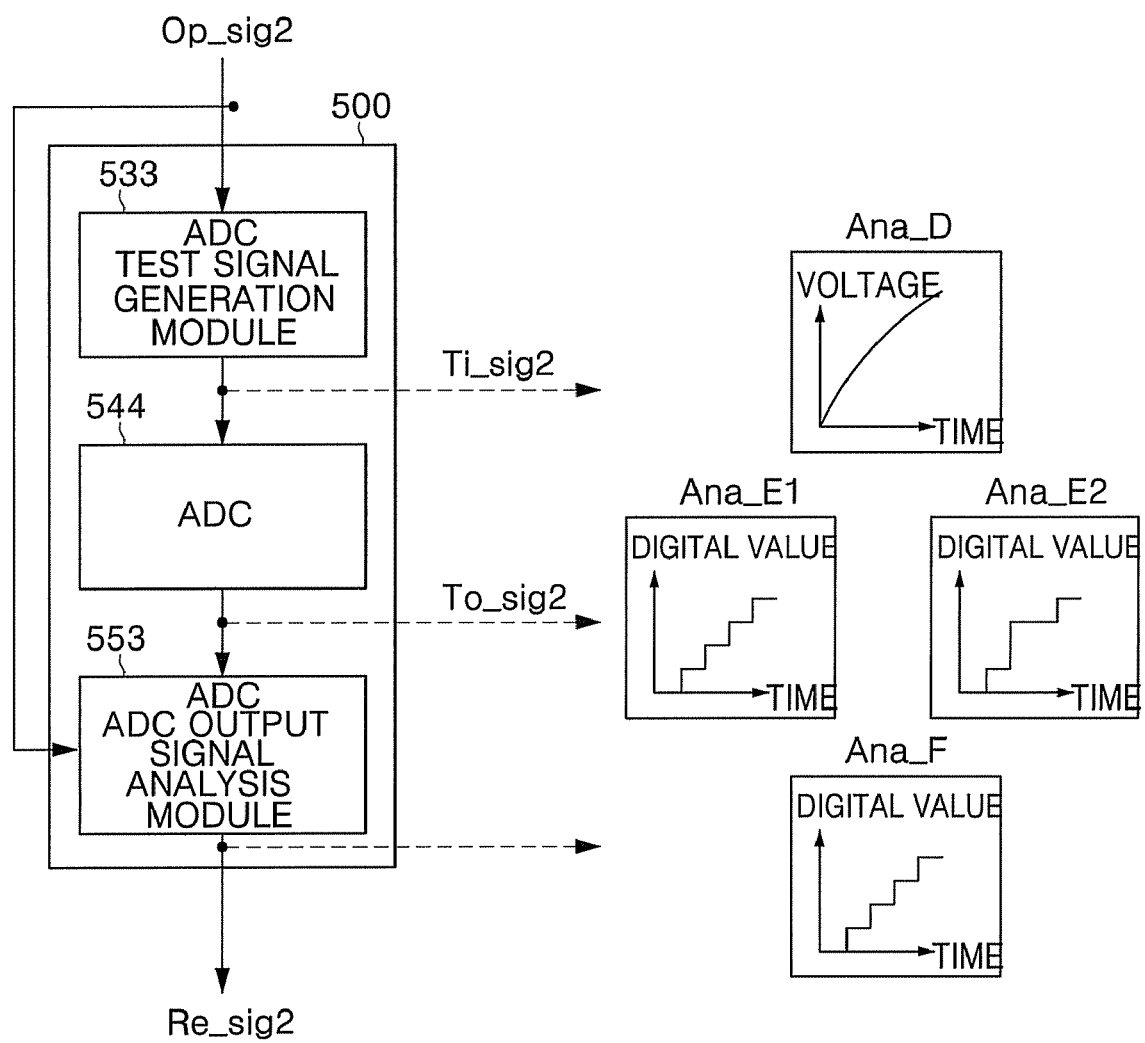
FIG. 5 is a diagram illustrating a method of testing an analog-to-digital (A/D) converter included in an optical position tracking device according to an embodiment of the present invention.

FIG. 5 is a diagram illustrating a method of testing an ADC included in an optical position tracking device according to an embodiment of the present invention.

FIG. 5 illustrates an ADC test signal generation module 533, an ADC 544, and an ADC output signal analysis module 553 of an optical position tracking device 500, and output signals Ana_D to Ana_F generated during respective processes.

A method of testing the ADC 544 will now be described with reference to FIGS. 3C and 5.

When a command signal COM for testing the ADC 544 is applied from a computer or an external system via a test interface unit 510 to a controller 520, the controller 520 outputs a test operation signal Op_sig2 for testing the ADC 544 to the ADC test signal generation module 533 and the ADC output signal analysis module 553.

The ADC test signal generation module 533 outputs a test signal Ti_sig2 in response to the test operation signal Op_sig2. For instance, the ADC test signal generation module 533 generates an analog signal, which continuously changes over time, and outputs the test signal Ti_sig2.

The ADC 544 receives the test signal Ti_sig2, which is an analog value output from the ADC test signal generation module 533, performs an analog-to-digital conversion operation, and outputs the output signal To_sig2. The ADC output signal analysis module 553 confirms whether the output signal To_sig2 is equal to an ideal test output model signal, determines whether the ADC 544 is normal based on the comparison result, and transmits a result signal Re_sig2 via a test interface unit 510 to an external computer (not shown).

For example, when the test signal Ti_sig2 is an analog signal Ana_D and the output signal To_sig2 output from the ADC 544 in response to the test signal Ti_sig2 is a digital signal Ana_E1, since the output signal To_sig2 is equal to a digital signal Ana_F, which is a test reference signal of the ADC output signal analysis module 553, the test result signal Re_sig2 denotes that the ADC 544 is normal.

On the other hand, when the output signal To_sig2 output from the ADC 544 in response to the test signal Ti_sig2 is a digital signal Ana_E2, since the output signal To_sig2 is not equal to a digital signal Ana_F, which is a test reference signal of the ADC output signal analysis module 533, the test result signal Re_sig2 denotes that the ADC 544 is abnormal.

Figure 6:
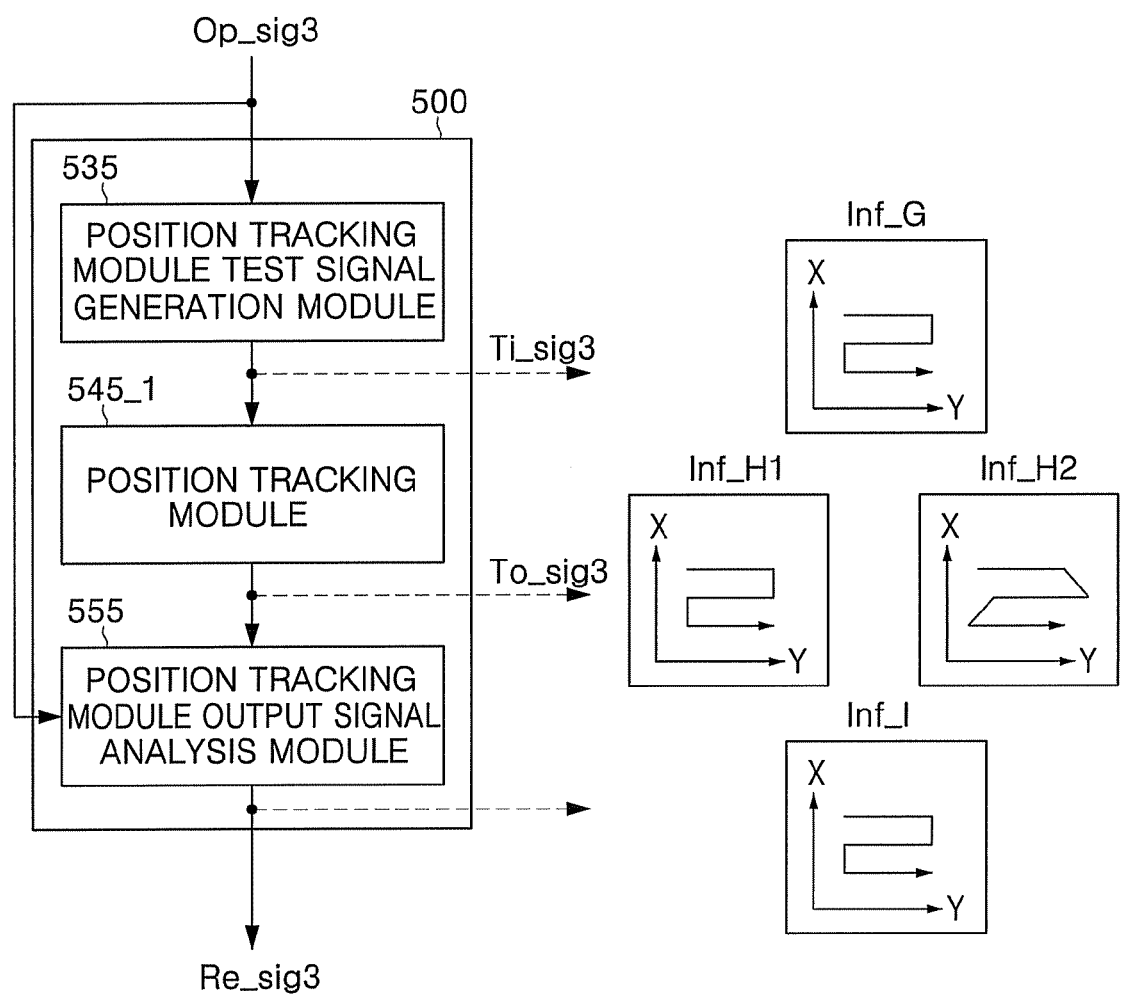
FIG. 6 is a diagram illustrating a method of testing a locating tracking module included in an optical position tracking device according to an embodiment of the present invention.

FIG. 6 is a diagram illustrating a method of testing a positing tracking module included in an optical position tracking device according to an embodiment of the present invention.

FIG. 6 illustrates a position tracking module test signal generation module 535, a position tracking module 545_1, and a position tracking module output signal analysis module 555 of an optical position tracking device 500 and output signals Inf_G to Inf_I generated during respective processes.

A method of testing the position tracking module 545_1 will now be described with reference to FIGS. 3C and 6.

When a command signal COM for testing the position tracking module 545_1 is applied from a computer or an external system via a test interface unit 510 to a controller 520, the controller 520 outputs a test operation signal Op_sig3 for testing the position tracking module 545_1 to the position tracking module test signal generation module 535 and the position tracking module output signal analysis module 555.

The position tracking module test signal generation module 535 outputs a test signal Ti_sig3 in response to the test operation signal Op_sig3. For instance, the position tracking module test signal generation module 535 generates a digital signal having a specific motion required for testing the position tracking module 545_1 and outputs the digital signal as a test signal Ti_sig3.

The position tracking module 545_1 receives the test signal Ti_sig3, which is the digital signal having the specific motion, from the position tracking module test signal generation module 535, calculates a motion value, and transmits an output signal To_sig3. The position tracking module output signal analysis module 555 confirms whether the output signal To_sig3 is equal to an ideal test output model signal, determines whether the position tracking module 545_1 is normal based on the comparison result, and transmits a result signal Re_sig3 through the test interface unit 510 to an external computer (not shown).

For instance, assuming that the test signal Ti_sig3 is a digital information signal Inf_G having information on the specific motion and the output signal To_sig3 output from the position tracking module 545_1 in response to the test signal Ti_sig3 is a digital information signal Inf_H1, since the output signal To_sig3 is equal to the digital information signal Inf_I, which is a test reference signal of the position tracking module output signal analysis module 555, the test result signal Re_sig3 denotes that the position tracking module 545_1 is normal.

On the other hand, when the output signal To_sig3 output from the position tracking module 545_1 in response to the test signal Ti_sig3 is a digital information signal Inf_H2, since the output signal To_sig3 is different from the digital information signal Inf_I, which is the test reference signal of the position tracking module output signal analysis module 555, the test result signal Re_sig3 denotes that the position tracking module 545_1 is abnormal.

Figure 7:
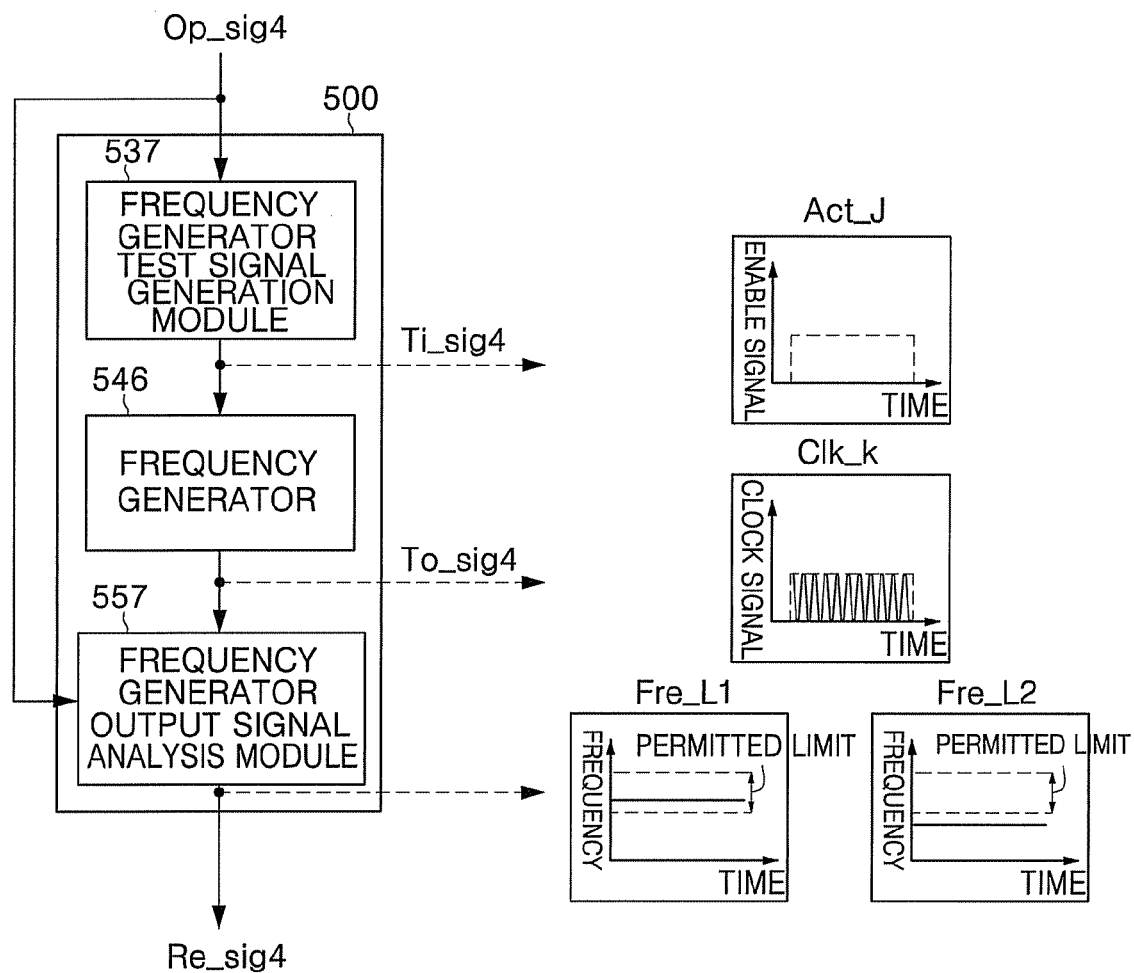
FIG. 7 is a diagram illustrating a method of testing a frequency generator included in an optical position tracking device according to an embodiment of the present invention.

FIG. 7 is a diagram illustrating a method of testing a frequency generator included in an optical position tracking device according to an embodiment of the present invention.

FIG. 7 illustrates a frequency generator test signal generation module 537, a frequency generator 546, and a frequency generator output signal analysis module 557 of an optical position tracking device 500 and output signals Act_J to Fre_L2 generated during respective processes.

A method of testing the frequency generator 546 will now be described with reference to FIGS. 3C and 7.

When a command signal COM for testing the frequency generator 546 is applied from a computer or an external system via a test interface unit 510 to a controller 520, the controller 520 outputs a test operation signal Op_sig4 for testing the frequency generator 546 to the frequency generator test signal generation module 537 and the frequency generator output signal analysis module 557.

The frequency generator test signal generation module 537 outputs a test signal Ti_sig4 in response to the test operation signal Op_sig4. For instance, the frequency generator test signal generation module 537 generates an enable signal for enabling operation for a predetermined period of time required for testing the frequency generator 546 and outputs the enable signal as a test signal Ti_sig4.

The frequency generator 546 receives the test signal Ti_sig4 from the frequency generator test signal generation module 537 and transmits an output signal To_sig4, which is a clock signal output during an enabled period.

The frequency generator output signal analysis module 557 converts the output signal To_sig4 into a frequency, confirms whether the frequency is within a permitted limit, determines whether the frequency generator 546 is normal, and transmits a result signal Re_sig4 via a test interface unit 510 to an external system (not shown).

For example, assuming that the test signal Ti_sig4 is an enable signal Act_J, the frequency generator 546 outputs a clock signal Clk_K as the output signal To_sig4 in response to the enable signal Act_J.

When the frequency of the clock signal Clk_K is within the permitted limit of the frequency generator output signal analysis module 557 (refer to Fre_L1), the test result signal Re_sig4 denotes that the frequency generator 546 is normal. When the frequency of the clock signal Clk_K is beyond the permitted limit (refer to Fre_L2), the test result signal Re_sig4 denotes that the frequency generator 546 is abnormal.

Although FIGS. 4 through 7 exemplarily illustrate cases where the result signals Re_sig1 to Re_sig4 are transmitted to the external system, a test result may be displayed using an additional apparatus or the illumination unit 542. It is clear that the external system is a test apparatus in the case of a semiconductor device for an optical position tracking device. Here, the test apparatus may not be a specialized high-performance used for the optical position tracking device but may correspond to any apparatus in which a program for conducting a test is installed.

It is described above that the image sensor 520, the ADC 540, the position tracking module 560, and the frequency generator 580 are tested subsequently and separately. However, the image sensor 520, the ADC 540, the position tracking module 560, and the frequency generator 580 may be tested concurrently and simultaneously. Also, it is clear that only a specific apparatus may be selectively tested according to a user's purposes. For example, while an image sensor and an ADC, which are analog test regions, are being tested as a unit, a position tracking module and a frequency generator, which are digital test regions, may be tested as a unit.

In addition, the controller 530 can output a control signal for controlling an external system during each test operation.

Therefore, the complexity of a method of testing an optical position tracking device according to the present invention can be markedly reduced and it is unnecessary to employ a high-performance test apparatus. Furthermore, the time taken to test the optical position tracking device can be shortened by simplifying and optimizing test circumstances, and a test can be performed by connecting the optical position tracking device with a simple system, such as a personal computer (PC), instead of exclusively employing a test apparatus.

According to exemplary embodiments of the present invention, an optical position tracking device having a self-test function includes a test signal generator and an output signal analyzer, unlike a conventional position optical position tracking device requiring an additional external test apparatus to perform a test using an interface portion.

Therefore, the complexity of a method of testing an optical position tracking device can be markedly reduced and it is unnecessary to employ a high-performance test apparatus. Furthermore, a time taken to test the optical position tracking device can be shortened by simplifying and optimizing test circumstances, and a test can be performed by connecting the optical position tracking device with a simple system, such as a personal computer (PC), instead of a specialized high-performance test apparatus.

Exemplary embodiments of the present invention have been disclosed herein and, although specific terms are employed, they are used and are to be interpreted in a generic and descriptive sense only and not for purposes of limitation. Accordingly, it will be understood by those of ordinary skill in the art that various changes in form and details may be made without departing from the spirit and scope of the present invention as set forth in the following claims.

What is claimed is:

1. An optical position tracking input device comprising:
   a controller for generating at least one test operation signal in response to a command signal;
   a test signal generator for generating a test signal during a test operation in response to the test operation signal;
   a motion calculator for receiving the test signal during the test operation and performing operations in response to the test operation signal to output an output signal; and
   an output signal analyzer for determining whether the output signal is correct during the test operation in response to the test operation signal to output a result signal.

2. The device according to claim 1, further comprising a test interface unit for transmitting the result signal to an external system.

3. The device according to claim 2, wherein the controller additionally outputs a control signal for controlling the external system, which receives the result signal from the test interface unit, in synchronization with the test operation signal.

4. The device according to claim 3, wherein the output signal comprises first through fourth output signals, and
   the motion calculator comprises:
   an image sensor for receiving the test signal and recognizing an image to output the first output signal corresponding to the recognized image;
   an analog-to-digital converter (ADC) for converting the first output signal into a digital signal to output the second output signal;
   a position tracking module for receiving the second output signal and calculating a motion value to output the third output signal corresponding to the calculated motion value; and
   a frequency generator for outputting the fourth output signal having a predetermined frequency in response to the test signal.

5. The device according to claim 4, wherein the result signal comprises first through fourth result signals, and
   the output signal analyzer comprises:
   an image sensor output signal analysis module for receiving the first output signal in response to the test operation signal, determining whether the first output signal is correct, and outputting the first result signal;
   an ADC output signal analysis module for receiving the second output signal in response to the test operation signal, determining whether the second output signal is correct, and outputting the second result signal;
   a position tracking module output signal analysis module for receiving the third output signal in response to the test operation signal, determining whether the third output signal is correct, and outputting the third result signal; and
   a frequency generator output signal analysis module for receiving the fourth output signal in response to the test operation signal, determining whether the fourth output signal is correct, and outputting the fourth result signal.

6. The device according to claim 3, wherein the test signal comprises first through fourth test signals, and
   the test signal generator comprises:
   an image sensor test signal generation module for generating the first test signal for recognizing an image in response to the test operation signal;
   an ADC test signal generation module for generating an analog signal, which continuously changes over time, as the second test signal in response to the test operation signal;
   a position tracking module test signal generation module for generating a digital signal having a specific motion as the third test signal in response to the test operation signal; and
   a frequency generator test signal generation module for generating a signal, which is enabled for a predetermined period of time, as the fourth test signal in response to the test operation signal.

7. The device according to claim 6, wherein the output signal comprises first through fourth output signals, and
   the motion calculator comprises:
   an image sensor for receiving the first test signal during a test operation in response to the test operation signal and recognizing an image to output the first output signal corresponding to the recognized image;

an ADC for converting the second test signal into a digital signal during the test operation in response to the test operation signal to output the second output signal;

a position tracking module for receiving the third test signal during the test operation in response to the test operation signal and calculating a motion value to output the calculated motion value as the third output signal; and a frequency generator for receiving the fourth test signal during the test operation in response to the test operation signal to output the fourth output signal during an enabled period of the fourth test signal.

8. The device according to claim 7, wherein the result signal comprises first through fourth result signals, and the output signal analyzer comprises:

an image sensor output signal analysis module for receiving the first output signal in response to the test operation signal and determining whether the first output signal is correct to output the first result signal;

an ADC output signal analysis module for receiving the second output signal in response to the test operation signal and determining whether the second output signal is correct to output the second result signal;

a position tracking module output signal analysis module for receiving the third output signal in response to the test operation signal and determining whether the third output signal is correct to output the third result signal; and a frequency generator output signal analysis module for receiving the fourth output signal in response to the test operation signal and determining whether the fourth output signal is correct to output the fourth result signal.

9. The device according to claim 8, further comprising:

an illumination unit for irradiating light to the surface of a worktable;

a lens for transmitting light reflected from the surface of the worktable to the image sensor; and an input portion including a button and a scroll apparatus to generate an input signal in response to a user's manipulation.

10. The device according to claim 9, wherein the illumination unit controls the intensity of light in response to the first test signal and changes the image recognized by the image sensor.

11. The device according to claim 9, wherein the image sensor adjusts the time taken to recognize the image in response to the first test signal and changes the recognized image.

12. The device according to claim 9, wherein the illumination unit displays test results in response to the result signal.

13. The device according to claim 9, wherein the command signal is input by the input portion.

14. The device according to claim 9, wherein the command signal is input through the test interface unit.

15. A method of testing an optical position tracking input device, comprising:

generating a command signal for executing a test operation of the optical position tracking device;

generating at least one test operation signal for testing a motion calculator in response to the command signal;

generating a test signal for testing a test module in response to the test operation signal;

receiving the test signal in response to the test operation signal and performing, by the motion calculator, operations to generate an output signal; and inputting the output signal in response to the test operation signal and determining whether the output signal is correct to generate a result signal.

16. The method according to claim 15, wherein generating the test operation signal comprises additionally generating a control signal for controlling an external system in synchronization with the test operation signal.

17. The method according to claim 16, wherein the output signal comprises first through fourth output signals, and generating the output signal comprises:

recognizing an image in response to the test signal and outputting the first output signal corresponding to the recognized image;

converting the first output signal into a digital signal and outputting the second output signal;

outputting the fourth output signal having a predetermined frequency in response to the test signal; and inputting the second output signal, calculating a motion value, and synchronizing the calculated motion value with the fourth output signal to output the third output signal.

18. The method according to claim 17, wherein generating the result signal comprises:

generating first through fourth reference signals in response to the test operation signal; and comparing the first through fourth output signals with the first through fourth reference signals, respectively, to determine whether the first through fourth output signals are correct.

19. The method according to claim 16, wherein the test signal comprises: a first test signal for allowing an image sensor to recognize an image; a second test signal continuously changing over time; a third test signal having a specific motion; and a fourth test signal enabled for a predetermined period of time, and outputs at least one of the first through fourth test signals in response to the test operation signal.

20. The method according to claim 19, wherein the output signal comprises: a first output signal corresponding to the image recognized by the image sensor; a second output signal obtained by converting the second test signal into a digital signal; a third output signal corresponding to a motion value calculated using the third test signal; and a fourth output signal having a predetermined frequency and output during the enabled period of the fourth test signal, and generating the output signal comprises outputting only one of the first through fourth output signals corresponding to the test signal output during the generation of the test signal.

21. The method according to claim 20, wherein the result signal comprises:

a first result signal output by determining whether the first output signal is correct; a second result signal output by determining whether the second output signal is correct; a third result signal output by determining whether the third output signal is correct; and a fourth result signal output by determining whether the fourth output signal is correct, and generating the result signal comprises outputting only one of the first through fourth result signals corresponding to the output signal output during the generation of the output signal.

22. The method according to claim 20, wherein generating the result signal comprises:

generating first through fourth reference signals in response to the test operation signal; and comparing the first through fourth output signals with the first through fourth reference signals, respectively, to determine whether the first through fourth output signals are correct.

23. The method according to claim 16, wherein generating the command signal is performed by handling an input portion of the optical position tracking device.

24. The method according to claim 16, wherein generating the output signal comprises:
adjusting the intensity of light output from an illumination unit of the optical position tracking device in response to the test signal;
sensing an image according to the adjusted intensity of light; and
outputting the output signal corresponding to the sensed image.

25. The method according to claim 16, wherein generating the output signal comprises:
adjusting a sensing time of an image sensor of the optical position tracking device in response to the test signal;
sensing an image according to the adjusted sensing time; and
outputting the output signal corresponding to the sensed image.

26. The device according to claim 1, further comprising:
an illumination unit for irradiating light to the surface of a worktable;
a lens for transmitting light reflected from the surface of the worktable to an image sensor to meet the antecedent basis requirement; and
an input portion including a button and a scroll apparatus to generate an input signal in response to a user's manipulation.

27. The device according to claim 26, wherein the illumination unit controls the intensity of light in response to the test signal and changes the image recognized by the image sensor.

28. The device according to claim 26, wherein the image sensor adjusts the time taken to recognize the image in response to the test signal and changes the recognized image.

29. The device according to claim 26, wherein the illumination unit displays test results in response to the result signal.

30. The device according to claim 26, wherein the command signal is input by the input portion.

31. The device according to claim 2, wherein the command signal is input through the test interface unit.

* * * * *